United States Patent [19]

Howard et al.

[11] 4,368,151

[45] Jan. 11, 1983

[54] 7S AND 11S VEGETABLE PROTEIN FRACTIONATION AND ISOLATION

[75] Inventors: Paulette A. Howard; William F. Lehnhardt; Frank T. Orthoefer, all of Decatur, Ill.

[73] Assignee: A. E. Staley Manufacturing Company, Decatur, Ill.

[21] Appl. No.: 291,670

[22] Filed: Aug. 10, 1981

[51] Int. Cl.³ .............................................. A23J 1/14
[52] U.S. Cl. .......................... 260/123.5; 260/112 R; 426/629; 426/634; 426/656
[58] Field of Search .......................... 260/112 R, 123.5

[56] References Cited

U.S. PATENT DOCUMENTS 4,131,607  12/1978  Petit et al. ........................ 260/123.5

OTHER PUBLICATIONS

Cereal Chemistry, vol. XXV, Nos. 1-6, Jan.-Nov. (1948), Smith et al., pp. 399-406.

*Primary Examiner*—Howard E. Schain
*Attorney, Agent, or Firm*—M. Paul Hendrickson; Charles J. Meyerson

[57] ABSTRACT

Aqueous mixtures of water-soluble 7S and 11S proteins are effectively fractionated and isolated by precipitating the 11S protein at a pH 5.8-6.3 in the presence of carefully controlled concentrations of water-soluble salts and sulfurous ions. The enriched 7S whey may then be adjusted to a pH 5.3-5.8 to precipitate substantially all of the remaining water-soluble 11S protein from the whey and an enriched 7S fraction may then be recovered from the whey. The fractionation is capable of producing either 11S or 7S isolates which respectively contain less than 5% 7S or 11S protein impurities.

13 Claims, No Drawings

7S AND 11S VEGETABLE PROTEIN FRACTIONATION AND ISOLATION

BACKGROUND OF THE INVENTION

Fractionation studies pertaining to isolation and separation of soy protein of varying molecular weight have been extensively reported. The 2S, 7S, 11S and 15S proteins are the most commonly reported soy protein fractions. Soybeans as a Food Source (CRC Press, Cleveland, Ohio, 1971) reports the 2S protein (8,000–21,500 M.W.) typically comprises approximately 22%, the 7S (110,000–210,000 M.W.) approximately 37%, the 11S (about 350,000 M.W.) about 31% and the 15S (about 600,000 M.W.) approximately 11% of the total weight of the protein composition of defatted soybean products. These protein fractions may be precipitated from solution at an isoelectric precipitating pH with the pH 4.0–5.0 range. In addition, soybeans contain a water-soluble protein fraction which is not precipitable at the isoelectric precipitating pH. These proteins remain soluble in water throughout the pH 4.0–5.0 range and are commonly referred to as the whey proteins.

U. S. Pat. No. 4,172,828 by Davidson et al. discloses a multiple-staged isolate separation recovery process. The initial soy protein extraction is conducted at pH 6.2–6.8 and isolated from the extract by cooling. Another fraction is then isolated from the extract by precipitation at a pH 4.5. Two other soy isolate fractions may be obtained by heating the extract and precipitating an isolate therefrom at a pH 5.3 with the remaining isolated fraction being obtained from the extract by a pH 4.5 curding and cooling step.

A patent by Calvert (U.S. Pat. No. 2,451,659) discloses extracting a soy protein at a pH 4.2–4.8 in the presence of an enzyme inhibiting agent and an oxygen excluding or blanketing agent. A patent issued to Eberl et al., U.S. Pat. No. 2,479,481 discloses a method for producing a substantially undernatured vegetable isolate. According to the Eberl et al. patent, the protein extraction may be suitably conducted at a pH 6.0–9.0. An isolate is curded and recovered from the extract by a pH 4.3–4.9 adjustment with sulfur dioxide. U.S. Pat. No. 3,303,182 discloses an isolation process in which the soy solubles are extracted at a temperature in excess of 80° C. The heated extract is then rapidly cooled to below 50° C. with curding of the isolate therefrom at a pH 4.2–5.0. U.S. Pat. No. 4,188,399 by Shemer discloses extracting the water-soluble protein and carbohydrate constituents at a pH 5.1–5.9 in the presence of an antioxidant followed by a pH 4.5 adjustment with phosphoric acid to provide a viscous proteinaceous solution containing more than 70% by weight 7S soy protein fraction. A U.S. Pat. No. by Melnychyn et al. U.S. Pat. No. (3,360,753) discloses a process for producing a freeze-dried isolate. The process is conducted in the presence of specific types of oxidizing or thiol bearing reagents which are capable of reacting with disulfide linkages at elevated temperatures with the extracted protein being precipitated at pH 4.5.

An early U.S. Pat. No. by John R. Turner (2,489,208) discloses the use of an alkaline material such as sodium sulfite, sodium carbonate or sodium hydroxide to extract glycinin at a pH 6.4–6.8. The glycinin is then precipitated from the extract by adjusting the extract to its isoelectric pH (e.g. pH 4.2–4.6) with sulfur dioxide.

Several publications also report the affects of saline solutions upon the extraction of soy proteins. A publication by A. K. Smith et al., (Jr. American Chemical Society, Vol. 60, June 1938, pages 1316–1320) mention "that the amount of protein extracted from seed by neutral salts depends upon the kind and concentration of salt used". Smith et al. reports that the extraction of soybean meal with pH 6.7 water alone yields more protein extract than an aqueous extraction in the presence of neutral salts. The aqueous extraction of defatted soy meals at a pH 4.0–7.0 in the presence of water-soluble sulfite, bisulfite or dithionate salts, preferably an alkali metal (including ammonium) salt and precipitation of an isolate at pH 4.8 has been reported by British Pat. No. 1,377,392.

U.S. Pat. No. 4,131,607 by Petit et al. discloses a two-stage alkaline extraction. The extraction is initially conducted in the presence of sodium sulphite and magnesium salt at a pH 7.0–8.5 which is then increased to a pH 10.0–10.5 to complete the extraction. The protein extracts are then precipitated or curded by adjusting the extract to a pH 4.5–5.5. A patent issued to Martinez et al. (U.S. Pat. No. 3,579,496) similarly discloses a double extraction process. A 0.008 M aqueous polyvalent cationic salt solution is initially employed to extract a protein fraction which is curded therefrom at pH 3.8–4.2. The second extraction is conducted at an alkaline pH in excess of pH 9.0 with the extracted protein being recovered at pH 6.8–7.1.

Thanh et al. (Jr. Agr. Food Chem., Vol. 24, No. 6, 1976, pages 1117–1121) disclose a preparative technique for precipitating 11S from a crude 7S and 11S soy globulin mixture by adjusting the protein extract buffered with dilute tris(hydroxymethyl)aminomethane to a pH 6.4. The acid-precipitated 11S protein is recovered by centrifugation and the 7S protein is separated from the supernatant by pH 4.8 acid-precipitation. The 7S precipitate was redissolved in water, buffered with tris and adjusted to pH 6.2 to solubilize the 7S therefrom. The pH, ionic strength, tris buffer and protein concentration reportedly affect the efficacy of the 7S and 11S fractionation.

Other articles reporting means for the separating of the 7S or 11S components include "Purification of the 11S Components of Soybean Protein" by Eldridge et al. (Cereal Chem. Vol. 44, Nov. 1967, pages 645–652), "An Electrophoretic Analysis of Soybean Protein" by Briggs et al., (Cereal Chem., Vol. 27, May 1950, pages 243–257) and "Purification and Characterization of the 11S Component of Soybean Proteins" by Wolf et al., (Archieves of Biochemistry and Biophysics 85, pages 186–199 (1959)).

As evident from the above art, a host of 7S and 11S fractionation processes have been proposed. Although many of the proposed fractionation processes may be useful to laboratory study and characterize the different protein fractions of soy proteins, the proposals generally are unsatisfactory of adaptation to a commercial manufacture of 7S and 11S isolates.

DESCRIPTION OF THE INVENTION

According to the present invention there is provided an improved method for separating and recovering at least one vegetable protein fraction from a crude vegetable protein extract mixture which contains 7S and 11S protein, said method comprising:

A. extracting water-soluble constituents from said vegetable protein material to provide a crude protein extract containing 7S and 11S proteins;

B. separating the water-soluble extracts from the insolubles to provide a clarified extract;

C. precipitating an enriched 11S protein fraction from the clarified extract at a pH ranging from 5.3–6.3 in the presence of an aqueous precipitating medium which contains from about 0.05 mM to about 0.5 mM sulfite ion and a sufficient amount of water-soluble salt to provide an ionic solution strength ranging from about 0.05u to about 0.1u; and D. recovering the enriched precipitated 11S protein fraction from said clarified extract.

The present invention provides a process for fractionating and recovering both 7S and 11S protein fractions from crude 11S and 7S containing extracts. Effective fractionation of the 11S protein fractions is accomplished by the inclusion of critical concentrations of sulfurous ions and water-soluble salts into the precipitating media and adjustment of the pH within narrowly defined pH ranges to selectively precipitate the 11S containing fractions from the extracted protein mixture. The sulfurous ion and water-soluble salt may be added at any convenient stage of the isolate manufacture so long as they are present during the precipitation of the 11S protein.

Although the water-soluble salts and sulfurous ions are essential to the effective fractionation of the 11S within the pH 5.3–6.3 range, definitive advantages are obtained by including the sulfurous ions and water-soluble salts as part of the extraction system for the crude protein mixture. The presence of water-soluble salt and ions improves upon the efficacy of the 7S and 11S extraction and yields, while placing the various protein molecular components in a form more suitable for subsequent fractionation, isolation and recovery. The sulfurous ion also measurably decreases the protein solution viscosity which, in turn, enables the extraction to be conducted at a higher solids level. For these reasons, the water-soluble salt and sulfurous ion are advantageously included as part of the initial extracting media even though they are not required until the pH 5.3–6.3 adjustment has been made to precipitate the 11S protein.

The fractionation process of this invention applies to vegetable proteins derived from a variety of vegetative sources. Illustrative vegetable protein sources include oil-bearing seed materials such as cottonseeds, soybeans, sesame seeds, rape seed, sunflower seeds, safflower seeds, corn, wheat, mixtures thereof and the like. The defatted leguminous seed materials, especially defatted soybean material, are particularly suitable as a crude 11S and 7S mixture source material. Exemplary defatted soybean material sources for the 7S and 11S mixture includes soybean meal, soy flour, soy grits, soy protein concentrates, soy isolates, mixtures thereof and the like. Defatted vegetable means (e.g. 40% or more protein content), concentrates (e.g. 70 to 90% protein content), isolates (at least 90% protein content), mixtures thereof and the like are representative commercial sources for the 7S and 11S protein. Crude 7S and 11S protein isolate mixtures (dry, solution and/or slurry form) are a particularly suitable 7S and 11S mixture source material. Unlike meals or concentrates, isolates have typically been subjected to prior clarification and are substantially free from insoluble cellulosic fibers.

In a commercial operation, it is advantageous to extract the crude 7S and 11S isolate mixture, precipitate the protein and fractionate the 7S and 11S proteins in an integrated manufacturing operation. This will improve upon the recoverable yields of both the 7S and 11S fractions. The extraction of the water-solubles from defatted vegetable protein material is conducted at a pH level which extracts the 7S and 11S as well as the other soluble proteins and carbohydrate constituents from the material. Although it is feasible to extract below the isoelectric precipitation pH of the 7S and 11S proten (e.g. pH 3.0–4.0), the extraction pH is most appropriately conducted within the pH 6.0–10.0 range. Advantageously the proteins are extracted within the pH 6.5–9.0 range and preferably within the pH 7.0–8.5 range. This latter pH range preserves the native characteristics of the 11S and 7S protein molecules and places the protein extract in a form which may be more easily fractionated and converted to the desired 7S and 11S end-product fractions.

Supplemental additives to facilitate the solubles extraction and preservation of the protein extract in a suitable form for the ensuing fractionation, protein recovery and/or protein modification step may be alternatively incorporated into the extracting medium.

The extracting solvent to defatted seed material weight ratio employed during the extraction step will generally fall between 5:1 to 20:1, and advantageously within the 7:1 to 15:1 range. Enhanced 11S and 7S protein yields are achieved within the 8:1 to 12:1 ratio with about a 10:1 ratio providing the optimum conditions for 7S and 11S extraction.

Included amongst the factors influencing the confirmational characteristics of the protein extract are the pH, ionic strength, temperature and sulfurous ion content. The effect each factor has upon stabilizing the protein extract depends upon the stress any given factor or combination of factors places upon the extracted protein.

It is desirable to conduct the extraction under thermal conditions which protect the native rheological characteristics of the 7S and 11S protein extract. The 11S protein is sensitive to heat denaturization. Elevated temperatures (e.g. 50° C. or higher) may be used for relatively short periods of time (e.g. 2 minutes or less) without causing substantial denaturization of the 11S protein. In general, the extracting temperature will be most suitably conducted within about a 10° C. to 50° C. range, and advantageously, within about 20° C. to about a 40° C. range.

Upon completion of the 11S and 7S extraction, the water-insolubles (e.g. cellulosic materials, if present) are advantageously separated (e.g. filtration, centrifugation, etc.) from the soluble extracts. This permits the subsequent isolation and recovery of protein precipitates substantially free from cellulosic contamination.

Effective precipitation of the 11S fraction or the 7S and 11S mixture necessitates careful control of the sulfurous ions and water-soluble salt content of the precipitating media. In general, the ionic solution strength of the water-soluble salt component in the precipitating media will range between 0.005u. to 0.1u. Illustrative water-soluble salts include the alkali metal, alkaline earth metal and ammonium salts of mineral and organic acids. Included amongst such salts are the halides (e.g. chloride), acetates, adipates, citrates, fumarates, lactates, malates, phosphates, propionates, succinates, tartrates, maleate salts, mixtures thereof and the like. If desired, the buffering affect of certain of these salts can be used to effectively control the extracting or precipitating pH. Water-soluble salts sufficient to provide an ionic strength within the 0.01u.-0.06u. range (particularly without about the 0.02u. to about the 0.03u. range) provide a more effective protein fractionation of the 7S and 11S components Sodium chloride is the preferred salt.

In addition to the water-soluble salts, the precipitating media necessarily contains a sufficient level of sulfurous ions to permit either the 7S or 11S proteins to selectively precipitate from one another. For most applications, the sulfite ion requirements will, in general, range from about 0.1 mM to 3.0 mM with about a 0.5 mM to about a 2.0 mM range being typical for most operations. Sulfurous solutions or precursors thereof such as sulfur dioxide or water-soluble salts which form sulfurous acids in water may be used as a sulfite ion source. The sulfurous ion concentration generally ranges from about 0.01% to about 0.5% of the protein dry solids weight and most typically within about the 0.075% to about 0.2% range. Illustrative water-soluble salts of sulfurous acids include the alkali metal sulfites (e.g. potassium or sodium salts of sulfite, bisulfite, pyrosulfite, metabilsulfite, lithium sulfite) and other water-soluble producing salts and cations (e.g. ammonium) mixtures thereof and the like. Particularly effective precipitation and fractionation results are obtained by employing from about 0.4 mM to about 1.2 mM sulfite ion.

Purity of both the 11S and 7S fraction isolated from the crude 7S and 11S protein mixture is dependent upon the pH conditions used to initially fractionate and precipitate the 11S protein from the clarified extract. By initially precipitating the 11S protein within the pH 5.3-6.3 range (particularly within the pH 5.8-6.3 range), at least a major weight portion of the extracted 11S protein can be recovered from the crude extract. The purity of the 11S fraction is optimized by initially precipitating the 11S within the pH 5.8-6.3 range. In order to obtain a 7S fraction having a purity of at least 75%, it is desirable to initially precipitate a 7S and 11S mixture within the pH 5.3-5.8 range.

In a more limited embodiment of the present invention there is provided a process for preparing 7S and 11S protein fractions from a clarified 7S and 11S protein mixture, said process comprising:
A. adjusting a clarified extract, containing a mixture of 7S and 11S proteins, from 0.5 mM to about 2.0 mM sulfurous ion and sufficient water-soluble salt to provide an ionic solution strength ranging from about 0.005u. to about 0.1u., to a pH 5.8-6.3 to precipitate an 11S protein fraction from the clarified extract;
B. recovering the precipitated 11S protein fraction from the clarified extract;
C. adjusting the clarified extract within the pH 5.3-5.8 range to precipitate along with a portion of the extracted 7S protein at least a major weight portion of the 11S protein remaining to said clarified extract to provide a 7S and 11S precipitate mixture;
D. recovering the 7S and 11S precipitate mixture from the extract; and
E. recovering another protein fraction from said extract which contains (on a weight basis) 7protein as the major protein constituent.

The present method affords effective recovery of 7S and 11S fractions from crude 7S and 11S mixtures. The method can provide a 7S fraction substantially free of 11S contamination and an enriched 11S fraction substantially free from 7S contamination. This avoids the need to further refine and purify either the 7S or 11S fractions.

The relative purity of the 7S and/or 11S fractions may be effectively controlled by the pH and salt concentration of the extracting solvent. The ability to control the 7S and 11S ratio also affords a means for effectively tailoring the isolate product to functionally serve a wider variety of end uses.

Since the extraction is typically conducted under a neutral or slightly alkaline condition, effective recovery of an 11S isolate, 11S and 7S isolate mixture necessitates progressive and subsequent pH adjustment towards a more acid pH after each isolation step. Organic or mineral acids may be used for this purpose. Illustrative organic acids include lactic acid, citric acid, and the like. Sulfurous acid, hydrochloric acid, sulfuric acid, phosphoric acid, mixtures thereof and the like are typical mineral acids which may be used to adjust the clarified medium to the appropriate pH range.

In each fractionation step, the acid-precipitated protein fraction may be separated from the remaining soy solubles by conventional curd recovery techniques such as by filtration, centrifugation, decantation, etc. Residual or occluded water-soluble carbohydrates, proteins, minerals and other contaminants may be further removed from isolated curds by coventional washing and refining techniques. The 11S curd may be dried or redissolved in water at pH<4.0 or ≧6.8. Alternatively the curded 11S protein may be dissolved by neutralizing with a base (e.g. pH 6.5-7.5) and dried (e.g. vacuum-, drum-, spray-, dielectric- and air-, freeze-, etc. drying) to proovide a dehydrated, water-soluble 11S proteinate product.

The isolation process is capable of yielding high purity 11S products. If desired, isolated proteins containing, on a dry substance weight basis, at least 90% by weight 11S protein, or if desired, 95% or higher 11S protein can be obtained.

After the initial 11S precipitation, it is desirable to further remove 11S water-soluble protein from the extract. Except for the pH adjustment, the 11S and 7S mixture fractionation is advantageously conducted in the same manner as the 11S fractionation. Removal of the residual 11S protein from the extract may be effectuated by further reducing the extract pH to a level to precipitate the residual 11S protein. This step will produce an 11S and 7S protein mixture. A pH adjustment within the pH 5.2 to about 5.8 range is generally sufficient to permit removal of the remaining 11S protein therefrom while retaining at least a major weight portion of the 7S protein in the water-soluble form. By adjusting the extract to a pH between 5.3-5.5 the 11S precipitation is optimized with minimal 7S protein precipitation.

The 11S and 7S precipitate will typically contain (7S and 11S weight basis) from about 70% to about 95% percent 11S protein and about 5% to about 30% protein and most typically from about 80% to 90% 11S and 10% to 20% 7S.

After isolating the 11S and 7S mixture from the extract, a 7S fraction (substantially free from 11S contamination) can be recovered. A variety of 7S recovery means may be used. The 7S extract may be precipitated by adjusting the extract to a pH 4.0 to 5.0 range (preferably within the pH 4.2 to about pH 4.6 range). Under these precipitating conditions, the whey proteins and water-soluble carbohydrates remain in solution. The precipitated 7S isolate may then be recovered by conventional means (e.g. centrifugation, filtration, etc.) and if necessary washed, redissolved, reprecipitated and rewashed to provide a high purity 7S product.

The three-stage isolation process typically yields a 7S isolate which contains at least 85% by weight 7S protein and most typically in excess of 90% by weight 7S protein.

If desired, the 7S filtrate may also be directly recovered and used in its liquid form or dried (e.g. spray-drying, freeze-drying, vacuum-drying, drum-drying, etc.). The low molecular weight extract solubles (e.g. carbohydrates, salts, etc.) may be separated from the protein components by reverse osmosis or ultrafiltration, if desired. The filtration and recovery of the 7S proteins by this processing alternative is generally improved by adjusting the whey extract within the pH 6.5–8.0 range (preferably from about pH 6.8–7.5), filtering the extract and dehydrating the filtered extract to provide a dry, water-soluble 7S isolate.

In addition to providing a relatively simple process for effectively separating and isolating the 7S and 11S protein from vegetative source materials, the present process affords a means for improving the amount of recoverable protein from vegetable materials. The isolation process does not significantly alter the native character of the protein isolate. The amount of salt used in the 11S and 11S/7S mixture isolation is sufficiently low so as to avoid waste disposal problems and permits recovery of an isolated fraction free from salt contamination.

The 7S and 11S analysis herein were determined upon the basis of their sodium dodecyl sulfate (SDS) polyacrylamide gel electrophoresis profiles. Quantitation of the individual species was obtained by densitometric scanning of the SDS gel profiles. The total 7S globulin fraction is a sum of the alpha, alpha and beta subunits as described by Thanh et al. (Biochem. Biophys. Acta., 490 (1977) 370–384). The total 11S soy globulin fraction is likewise the sum of the acidic and basic subunits as described by Catsimpoolas et al. (Jr. Sci. Food Agric., 22 (1971) 448–450). 7S and 11S soy proteins were isolated by the procedure of Thanh et al. (Jr. Agric. Food Chem. 24 (1976) 1117–1121) and were used as standards for SDS polyacrylamide gel electrophoresis.

The SDS polyacrylamide gel electrophoresis was performed as described by Laemmli, Nature (London) 227 (1970) 680–685) with a vertical slab cell (Bio-Rad Laboratories, Richmond, Ca., Model 220) and D.C. power suppy (LKB, Bromma, Sweden, Model 2103). The separating and stacking gels were 10.5% and 4.5% acrylamide, respectively. Soy protein samples and standards are solubilized in 0.0625 M Tris-HCl buffer, pH 6.8 containing 1.0% w/v SDS, 10% w/v glycerol, 2% w/v 2-Mercaptoethanol and heated for 5 minutes at 100° C. The gels (2) were run for 1.5 hr. at 30 mA followed by 1.5–2 hr. at 80 mA. Molecular weight calibration protein standards were obtained from Pharmacea Fine Chemicals (Piscataway, N.J., LMW kit).

The proteins were stained (K. Wang, Biochem. 16 (1977) 1867–1865) in 0.1% w/v Coomassee Blue R-250 in 2-propanol-acetic acid-water, 25-10-65, V/V/V. Destaining was performed in a slab diffusion destainer (Bio- Rad Laboratories, Richmond Ca., Model 222) in 2-propanol-acetic acid-water, 10-10-80, V/V/V. The destained gels were scanned using a densitometer (E-C Apparatus Corp., Model EC-910) and dual channel, integrating Omni-Scribe® recorder (Houston Instruments, Austin, Tex., Model 5000).

Unless indicated otherwise, the precent distribution of the soy proteins is calculated by sum of the areas of the individual subunit species representing the 7S or 11S soy protein aggregates divided by the 7S and 11S subunit area times 100 as determined by the following equations:

$$\% \ 7S \ \text{protein} = \frac{(\alpha' + \alpha + \beta)}{(\alpha + \alpha' + \beta) + (A \ \text{Sub.} + B \ \text{Sub.})} \times 100 \quad \text{I.}$$

$$\% \ 11S \ \text{protein} = \frac{A \ \text{Sub.} + B \ \text{Sub.}}{(\alpha' + \alpha + \beta) + (A \ \text{Sub.} + B \ \text{Sub.})} \times 100 \quad \text{II.}$$

wherein $\alpha'$, $\alpha$ and $\beta$ represent the major subunit species area of the 7S globulin as defined by Thanh et al; and the A Sub. and B Sub. respectively represent the acidic and basic subunit areas of the 11S globulin as defined by Catsimpoolas et al.

The ionic strength (u) for water-soluble salts employed herein are determined by the equation:

$$u = \tfrac{1}{2}\Sigma C_i Z_i^2$$

wherein $C_i$ represents the molar concentration for each ion and $Z_i$ the valance of each ion of the water-soluble salt contained within the precipitating medium. The u value is determined upon the basis of molarity of the added water-soluble salts and not the actual ionic strength of the precipitating media at any given pH level.

EXAMPLE 1

In this example, 3 different protein fractions were isolated from a soy grit extract. The first isolated fraction comprises 11S curd (95%), the second fraction a 7S (30%) and 11S (70%) mixture and the third isolated fraction was an enriched (95%) 7S curd.

The defatted soy grit was extracted at a pH 8.0 and 22° C. for 30 minutes (10:1 extraction medium:soybean flakes weight ratio), with an aqueous solution consisting of water, 0.03 M sodium chloride (0.03 u sodium chloride) and 0.77 mM sodiun bisulfite. The water-insolubles (spent flour) were separated from the extract by centrifugation (415 g's for 15 minutes) to provide a clarified extract which was adjusted with continuous low speed stirring to pH 6.0 with 3 N hydrochoric acid. The 11S precipitate was then recovered by centrifugation (415 g's for 15 minutes), dissolved in water at pH 7.0 and spray-dried.

A 7S and 11S mixture was then precipitated by adjusting the pH 6.0 supernatant to a pH 5.5 with 3 N hydrochloric acid. The precipitated 7S/11S curd was recovered by centrifugation (15 minutes at 415 g's ), redissolved in pH 7.0 water and spray-dried.

The high purity 7S fraction was isolated by adjusting the pH 5.5 supernatant to pH 4.5, recovered by centrifugation (415 g's for 15 minutes), redissolved in pH 7.0 water and spray-dried.

Under the aforementioned 7S isolation technique, the nonprecipitable pH 4.5 whey proteins will remain in solution and are effectively separated from the precipitated 7S protein.

The recovered 11S, 7S and 11S mixture and 7S isolates respectively represented 22.8%, 4.8% and 25.3% (combined total of 52.9% of the total protein (nitrogen analysis) content of the soy grit.

EXAMPLE 2

This example illustrates the affect of sodium chloride concentration upon the 11S protein precipitation at a pH 6. The soy protein was extracted from defatted soy grits in accordance with Example 1, except the extraction was conducted at a pH 7.3 with an aqueous solution consisting of water, 0.48 mM sodium bisulfite and sodium chloride at the designated concentrations. The results of this study are reported in Table I.

The present solubles in Table II are based upon the total protein weight of the pH 7.5 extract. The protein percentages were determined by nitrogen analysis.

TABLE II

| | PROTEIN SOLUBILITY SODIUM BISULFITE CONCENTRATION (N) | | | | |
|---|---|---|---|---|---|
| pH | 0 | 0.48mM | 0.96mM | 1.92mM | 2.8mM |
| 7.5 | 100% | 100% | 100% | 100% | 100% |
| 6.0 | 60.2% | 62.6% | 61.7% | 64.0% | 70.6% |
| 5.7 | 43.3% | 59.8% | 59.0% | 58.0% | 60.1% |
| 5.5 | 29.7% | 51.5% | 54.8% | 52.0% | 54.9% |
| 5.3 | 24.6% | 34.0% | 36.5% | 39.0% | 40.1% |
| 5.0 | 16.1% | 15.5% | 16.0% | 22.0% | 23.7% |

Electrophoretic analysis of the protein remaining in solution at the designated pH levels and sulfurous ion concentrations are reported in Table III.

TABLE III

| | 7S and 11S SOLUBILITY | | | | | | | | | |
|---|---|---|---|---|---|---|---|---|---|---|
| | NONE | | 0.48mM | | 0.96mM | | 1.92mM | | 2.88mM | |
| pH | 11S | 7S | 11S | 7S | 11S | 7S | 11S | 7S | 11S | 7S |
| 7.5 | 100% | 100% | 100% | 100% | 100% | 100% | 100% | 100% | 100% | 100% |
| 6.0 | 24.1% | 93.2% | 30.6% | 99% | 23.3% | 93% | 28.3% | 91% | 36.2% | 89.7% |
| 5.7 | 8.5% | 75.8% | 21.3% | 100% | 17.5% | 100% | 13.9% | 82% | 17.4% | 88.1% |
| 5.5 | 2.6% | 48.6% | 10.5% | 100% | 15.1% | 96% | 9.3% | 84% | 16.6% | 79.1% |
| 5.3 | 0 | 39.1% | 1.9% | 77% | 1.8% | 71.6% | 1.2% | 81% | 0 | 64.7% |
| 5.0 | 0 | 4.9% | 0 | 25% | 0 | 24.3% | 0 | 44% | 0 | 41.0% |

TABLE I

| | | Composition Curd at 6.0 pH | | Composition Whey at 6.0 pH | |
|---|---|---|---|---|---|
| NaCl—M | 6.0 pH Curd Yield (%) | % 11S | % 7S | % 11S | % 7S |
| 0 | 3.2 | 64.9 | 7.2 | 40.7 | 26.0 |
| 0.01 | 14.3 | 57.2 | 3.9 | 33.0 | 35.0 |
| 0.02 | 19.7 | 73.4 | 5.2 | 21.7 | 36.5 |
| 0.03 | 19.1 | 71.0 | 5.0 | 22.2 | 34.5 |
| 0.04 | 18.2 | 69.4 | 5.4 | 24.2 | 36.1 |
| 0.05 | 19.0 | 71.6 | 3.9 | 25.9 | 31.4 |
| 0.06 | 20.7 | 70.6 | 6.7 | 26.3 | 32.0 |
| 0.07 | 17.3 | 76.1 | 4.4 | 30.9 | 29.7 |
| 0.08 | 19.9 | 76.6 | 3.9 | 34.0 | 29.3 |
| 0.09 | 17.1 | 77.2 | 4.9 | 34.6 | 34.1 |
| 0.10 | 15.6 | 59.8 | 4.9 | 35.3 | 28.5 |
| 0.20 | 0.3 | 16.5 | 18.8 | 44.5 | 20.4 |

As illustrated above, the amount of sodium chloride present during the 11S fractionation at pH 6.0 significantly affects 11S purity and yields. The 11S yields are substantially reduced if insufficient sodium chloride is used to fractionate and precipitate the 11S protein at pH 6.0. Similarly, excessive sodium chloride concentrations substantially impair effective 11S fractionation and isolation at a pH 6.0. The 0.01 M-0.1 M sodium choride range (i.e. ionic strength of 0.01u–0.1u) results in effective fractionation and isolation of 11S proteins with particularly effective results being obtained at about the 0.02 M to about 0.06 M sodium chloride range. The reported 7S and 11S percentages were determined by SDS electrophoresis in which the entire scanned area represents 100% of the total protein.

EXAMPLE 3

The affect of sulfurous ion upon 11S and 7S solubility at varying pH levels is illustrated by this example. A pH 7.5 aqueous extraction medium, containing 0.02 M sodium chloride and sulfurous ion (sodium bisulfite) at the designated concentrations of Table II was used to extract and fractionate 11S protein from the extract. The results of this study are reported in Tables II and III.

By comparing the relative 7S and 11S protein solubility results reported in Table III, it will be observed that ineffective 7S and 11S fractionation arises if sodium bisulfite is omitted or exceeds the 2.5 mM level. At either of these sulfurous ion extremes a substantial amount of the 7S protein is rendered water-insoluble and will precipitate along with the 11S protein within the pH 5.3–6.3 range. Substantial 7S solubility arises by the inclusion of sodium bisulfite within the 0.48 mM–1.92 mM range.

The relatively high proportion of water-soluble 7S protein and small amount of water-soluble 11S protein within the pH 5.3–5.7 range at the 0.48 mM–1.92 mM sulfurous ion range in the presence of water-soluble salts as reported in Table III illustrates the importance of the sulfurous ion concentration in achieving effective fractionation and isolation of a high purity 11S protein from a crude 7S and 11S extract.

EXAMPLE 4

This example illustrates the solubility of the 11S and 7S protein employing an isolation and fractionation medium which contains 0.5 mM sodium bisulfite and 0.02 M sodium choride at the designated pH levels. Table IV reports the precentages of 11S and 7S protein of the total protein remaining in solution (whey) and precipitated protein (curd) at the designated pH levels. The reported 7S and 11S percentages were determined by SDS electrophoresis in which the entire scanned area represents 100% of the total protein.

TABLE IV

| | Whey Soluble Protein | | Curd Insoluble Protein | |
|---|---|---|---|---|
| pH | % 11S | % 7S | % 11S | % 7S |
| 7.5 (extract) | 48.3 | 27.8 | 0 | 0 |
| 6.0 | 18.3 | 42.0 | 79.8 | 3.9 |
| 5.7 | 14.4 | 51.7 | 78.5 | 4.5 |
| 5.5 | 13.3 | 48.0 | 78.2 | 8.6 |
| 5.3 | 2.4 | 54.5 | 63.8 | 13.7 |

TABLE IV-continued

| pH | Whey Soluble Protein | | Curd Insoluble Protein | |
|---|---|---|---|---|
| | % 11S | % 7S | % 11S | % 7S |
| 5.0 | 0 | 42.4 | 60.9 | 22.2 |

Table V reports the relative percentage of 7S and 11S protein (combined 7S and 11S total weight) as whey and curded protein at the listed pH levels. As illustrated by Table V, the percentage of water-soluble 11S protein remaining in the whey fraction is minimized at a pH 5.3–5.7 which, in turn, also provides a higher purity 11S curd. Conversely, the 7S solubility (whey) is optimized within the pH 5.3–5.7) range.

TABLE V

| pH | Whey 11S/7S | Curd 11S/7S |
|---|---|---|
| 7.5 | 63.5/36.5 | — |
| 6.0 | 30.3/69.7 | 95.4/4.6 |
| 5.7 | 21.8/78.2 | 94.6/5.4 |
| 5.5 | 21.4/78.6 | 90.1/9.9 |
| 5.3 | 4.2/95.8 | 82.4/17.6 |
| 5.0 | 0/100 | 73.3/26.7 |

This example was repeated except that the extraction and fractionation were accomplished with an aqueous solution consisting of water, 0.06 M sodium choride and 0.48 mM $SO_3^=$. Table VI reports the results of this study.

TABLE VI

| pH | Soluble Whey | | Insoluble Curd | |
|---|---|---|---|---|
| | % 11S | % 7S | % 11S | % 7S |
| 6.46 | 59.4 | 40.6 | 97.5 | 2.5 |
| 6.00 | 40.9 | 59.1 | 96.1 | 3.9 |
| 5.71 | 24.9 | 75.1 | 93.9 | 6.1 |
| 5.48 | 18.0 | 82.0 | 89.6 | 10.4 |
| 5.26 | 8.8 | 91.2 | 89.7 | 10.3 |
| 5.02 | 0 | 100 | 79.3 | 20.7 |
| 4.6 | 0 | 100 | 65.8 | 34.2 |
| 4.4 | 0 | 100 | 66.3 | 33.7 |

As will be observed from the Table VI data, the pH 6.0 11S precipitates employing the sulfurous ion and water-soluble salts in the amounts specified provides particularly effective fractionation of the 7S and 11S proteins.

What is claimed is:

1. A method for fractionating and recovering an enriched 11S protein fraction from a crude vegetable portein aqueous solution which contains, on a total protein weight basis, water-soluble 7S protein and water-soluble 11S protein as the major protein components of said solution, said method comprising:
   (A) providing to said solution a sufficient amount of:
      (i) from about 0.05 mM to about 5.0 mM sulfite ion; and
      (ii) water-soluble salt to provide an ionic solution strength ranging from about 0.0005u. to about 0.2u;
   (B) precipitating at least a major weight of said 11S protein from said solution within the pH 5.3–6.3 range; and
   (C) recovering the precipitated 11S protein from said solution.

2. The method according to claim 1 wherein the sulfurous ion content of said solution ranges from about 0.1 mM to about 2.0 mM.

3. The method according to claim 2 wherein the ionic solution strength of the water-soluble salt ranges from about 0.01u. to about 0.06u.

4. The method according to claim 3 wherein the vegetable protein consists essentially of soy protein and the 11S is precipitated from said solution at a pH ranging from about 5.8 to about 6.3

5. The method according to claim 4 wherein, after recovery of the precipitated 11S protein, the aqueous solution is adjusted within the pH 5.3 to 5.8 range to precipitate at least a major portion of the water-soluble 11S protein remaining in said solution along with a minor portion of said water-soluble 7S protein.

6. The method according to claim 5 wherein said precipitated mixture of 7S protein and 11S protein is recovered from said solution to provide an enriched 7S protein solution.

7. The method according to claim 5 wherein the protein solution is adjusted to a pH ranging from about 5.3 to about 5.5 and a 7S and 11S mixture is precipitated from said protein solution.

8. The method according to claim 7 wherein the precipitated 7S and 11S mixture is recovered from said solution to provide an enriched 7S solution and a dry, enriched 7S isolate is recovered from said enriched 7S solution.

9. A method for preparing 7S and 11S protein fractions from a clarified 7S and 11S protein mixture, said process comprising:
   (A) adjusting a clarified extract, containing a mixture of 7S and 11S protein, from about 0.1 mM to about 2.0 mM sulfite ion and sufficient water-soluble salt to provide an ionic solution strength ranging from about 0.005u. to about 0.1u., to a pH 5.8–6.3 to precipitate an 11S protein fraction from the clarified extract;
   (B) recovering the precipitated 11S protein fraction from the clarified extract;
   (C) adjusting the clarified extract within the pH 5.3–5.8 range to precipitate along with a portion of the extracted 7S protein at least a major weight portion of the 11S protein remaining in said clarified extract to provide a 7S and 11S precipitate mixture;
   (D) recovering the 7S and 11S precipitate mixture from the extract; and
   (E) recovering another protein fraction from said extract which contains (on a weight basis) 7S protein as the major protein constituent.

10. The method according to claim 9 wherein the ionic solution strength of the water-soluble salt ranges from 0.01u. to 0.06u.

11. The method according to claim 10 wherein the sulfite ion ranges from about 5.0 mM to about 1.5 mM inclusive.

12. The method according to claim 11 wherein at least a major weight portion of the water-soluble 11S protein is precipitated from said solution within the pH 5.8–6.3 range.

13. The method according to claim 11 wherein a sufficient amount of water-soluble 11S protein is precipitated from said solution within the pH 5.3–6.3 range to provide an enriched 7S solution which contains on a total 7S and 11S protein weight basis at least 85% by weight 7S protein.

* * * * *

UNITED STATES PATENT AND TRADEMARK OFFICE
CERTIFICATE OF CORRECTION

PATENT NO. : 4,368,151
DATED : January 11, 1983
INVENTOR(S) : Paulett Ann Howard, William F. Lehnhardt & Frank T. Orthoefer It is certified that error appears in the above-identified patent and that said Letters Patent are hereby corrected as shown below:

```
Column 3, line 12; for "0.05 u" read ---0.005 u---
Column 5, line 5; for "without" read ---within---
Column 5, line 50; for "from 0.5" read ---from about 0.5---
Column 5, line 61; for "to said" read ---in said---
Column 5, line 67; for "7 protein" read ---7S protein---
Column 6, line 37; for "proovide" read ---provide---
Column 6, line 62; for "30% protein" read ---30% 7S protein---
Column 7, line 58; for "are" read ---were---
Column 7, line 66; for "1867-1865" read ---1857-1865---
Column 9, line 52; for "choride" read ---chloride---
Column 10, line 1; for "present" read ---percent---
Column 10, line 53; for "choride" read ---chloride---
Column 11, line 16; for "5.3-5.7)" read ---5.3-5.7---
Column 11, line 29; for "choride" read ---chloride---
Column 12, line 56 (cl.11); for "5.0mM to about 1.5mM" read
           ---0.5mM to about 1.5mM---
```

Signed and Sealed this

Seventh Day of May 1985

[SEAL]

Attest:

DONALD J. QUIGG

Attesting Officer      Acting Commissioner of Patents and Trademarks